(12) United States Patent
Endo et al.

(10) Patent No.: US 11,420,519 B2
(45) Date of Patent: Aug. 23, 2022

(54) MOVABLE BODY AND MOVABLE SYSTEM

(71) Applicant: TOYOTA JIDOSHA KABUSHIKI KAISHA, Toyota (JP)

(72) Inventors: Masato Endo, Chofu (JP); Katsuhiko Yourou, Toyota (JP); Shunji Tateishi, Kasugai (JP); Nobukatsu Fujishita, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 281 days.

(21) Appl. No.: 16/790,008

(22) Filed: Feb. 13, 2020

(65) Prior Publication Data
US 2020/0282834 A1 Sep. 10, 2020

(30) Foreign Application Priority Data

Mar. 6, 2019 (JP) .............................. JP2019-040140

(51) Int. Cl.
| | | |
|---|---|---|
| *B60K 35/00* | (2006.01) | |
| *H04W 4/44* | (2018.01) | |
| *B60R 16/023* | (2006.01) | |
| *B60N 2/02* | (2006.01) | |

(52) U.S. Cl.
CPC ............ *B60K 35/00* (2013.01); *B60R 16/023* (2013.01); *H04W 4/44* (2018.02); *B60K 2370/152* (2019.05); *B60K 2370/163* (2019.05); *B60N 2/0224* (2013.01)

(58) Field of Classification Search
CPC .............. B60K 35/00; B60K 2370/152; B60K 2370/163; B60R 16/023; H04W 4/44; B60N 2/0224; B60N 2/0244; B60N 2/16; G09F 21/048; G06Q 30/0265; G06V 20/588; G06V 40/10
See application file for complete search history.

(56) References Cited

U.S. PATENT DOCUMENTS

| | | | |
|---|---|---|---|
| 2004/0225419 A1 | 11/2004 | Sakai et al. | |
| 2008/0211652 A1* | 9/2008 | Cope | B60K 35/00 340/461 |
| 2008/0312797 A1* | 12/2008 | Takehisa | B60N 2/0244 701/49 |
| 2014/0309862 A1* | 10/2014 | Ricci | B60W 40/09 701/36 |
| 2014/0309866 A1* | 10/2014 | Ricci | G06Q 30/0633 701/36 |

(Continued)

FOREIGN PATENT DOCUMENTS

| | | |
|---|---|---|
| CN | 1550378 A | 12/2004 |
| CN | 203753082 U | 8/2014 |

(Continued)

*Primary Examiner* — Richard M Camby
(74) *Attorney, Agent, or Firm* — Sughrue Mion, PLLC

(57) ABSTRACT

Provided is a movable system including a movable body to be used by a plurality of users, and a server device. When the server device receives identification information of a user from the movable body, the server device acquires setting information to set the form of the movable body based on the identification information of the user and transmits it to the movable body. The movable body includes a form changing unit configured to change the outer shape or the appearance of the movable body based on the setting information thus received.

6 Claims, 4 Drawing Sheets

(56) References Cited

U.S. PATENT DOCUMENTS

2017/0320501 A1* 11/2017 Li .......................... B60K 35/00
2018/0088887 A1* 3/2018 LeBlanc ................. G06F 3/147

FOREIGN PATENT DOCUMENTS

| CN | 108482280 A | 9/2018 |
| JP | 2008-287192 A | 11/2008 |
| JP | 2013-089096 A | 5/2013 |

* cited by examiner

MOVABLE BODY AND MOVABLE SYSTEM

INCORPORATION BY REFERENCE

The disclosure of Japanese Patent Application No. 2019-040140 filed on Mar. 6, 2019 including the specification, drawings and abstract is incorporated herein by reference in its entirety.

BACKGROUND

1. Technical Field

The present disclosure relates to a movable body and a movable system.

2. Description of Related Art

In the related art, there has been known a movable body configured such that the color of a vehicle body of the movable body changes.

Japanese Unexamined Patent Application Publication No. 2008-287192 (JP 2008-287192 A) describes a body color change device configured to change the color of a vehicle body of a host vehicle appropriately in accordance with an external environment. Japanese Unexamined Patent Application Publication No. 2013-89096 (JP 2013-89096 A) describes an advertisement display system in which a display is provided in a vehicle body, pieces of position information of a plurality of vehicles present in a predetermined region are acquired, and an advertisement is displayed over those vehicles.

SUMMARY

However, there has not been known such a technique that, when a moving service such as a sharing service that uses a movable body usable by a plurality of users is provided, the form of a vehicle body such as color is changed in accordance with the interest, taste, or the like of each user.

In view of this, an object of the present disclosure is to provide a movable body that can change its form per user when the movable body is used by a plurality of users.

A movable body according to one aspect of the present disclosure is a movable body to be used by a plurality of users. The movable body includes an acquisition unit and a form changing unit. The acquisition unit is configured to acquire identification information of a user. The form changing unit is configured to output a control signal to change the form of the movable body based on the identification information.

The form to be changed is not limited to the outer shape, that is, the shape observable from outside the movable body and includes the color or pattern of part of the appearance. Further, the form to be changed may be the color or pattern of part of the interior of the movable body that is observable by an occupant of the movable body but is not observable or is hardly observable from outside the movable body. The user is typically a driver who controls driving of the movable body. The movable body is typically a small movable body for one or two occupants.

A movable system according to one aspect of the disclosure includes the movable body and a server device. The server device includes a receiving unit, a second acquisition unit, and a second transmission unit. The receiving unit is configured to receive the identification information from the movable body. The second acquisition unit is configured to acquire setting information based on the identification information. The second transmission unit is configured to transmit the setting information to the movable body.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

The following describes an embodiment of the present disclosure in detail with reference to the drawings. The following embodiment is an example to describe a gist of the present disclosure and shall not be used to understand the gist of the present disclosure by limiting the embodiments of the present disclosure. Note that the same reference sign is assigned to a constituent demonstrating the same or similar function, and a redundant description is omitted.

Figure 1:
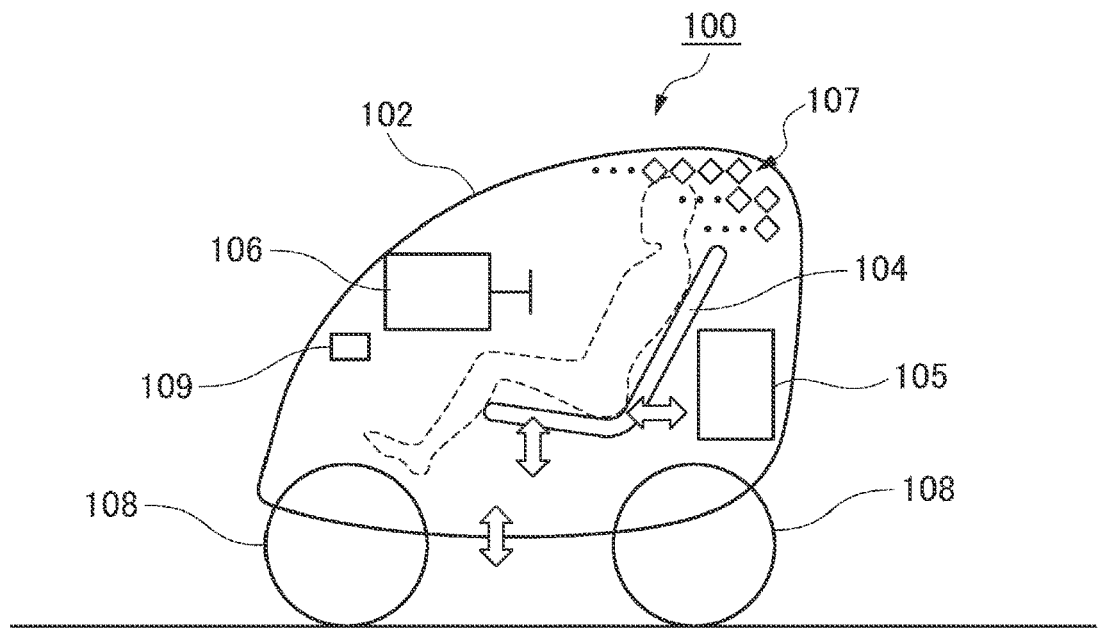
FIG. 1 is a view illustrating a schematic configuration of a movable body according to the present embodiment.

FIG. 1 is a view illustrating a schematic configuration of a personal movable body according to the present embodiment. A personal movable body 100 according to the present embodiment is used in an airport by users of the airport such as travelers and staffs working at the airport, for example. Further, the same movable body 100 can be used sequentially by a plurality of users.

Such a movable body 100 includes: a vehicle body 102; a seat unit 104 attached to the vehicle body 102 and including a seat on which a driver or other occupants sit; an operation unit 106 including a handle gripped by the driver to drive the movable body 100; and a plurality of wheels 108 for moving the vehicle body 102. The vehicle body 102 includes an air suspension configured to change the vehicle height. The seat unit 104 includes a seat reclining device including an electric motor configured to move the seat in the front-rear direction and in the up-down direction, and a roof opening and closing mechanism configured to remove a roof part of the vehicle body 102. Further, a trunk unit 105 in which a trunk for receiving the baggage of an occupant is formed is provided behind the seat unit 104. Further, a pair of side mirrors 109 is attached to the vehicle body 102, and a plurality of LEDs 107 is attached to a surface of the vehicle body 102 that faces outward and an inner wall of the vehicle body 102.

The movable body 100 according to the present embodiment is a small vehicle for one or two occupants, for example. Two wheels 108 are provided on the front side of the movable body 100, and one wheel 108 is provided on the rear side of the movable body 100, for example. The movement of the movable body 100 may be controlled such that the driver operates the movable body 100, or the movable body 100 may be configured to be switched to an automatic driving mode so that the movable body 100 automatically drives itself.

Figure 2:
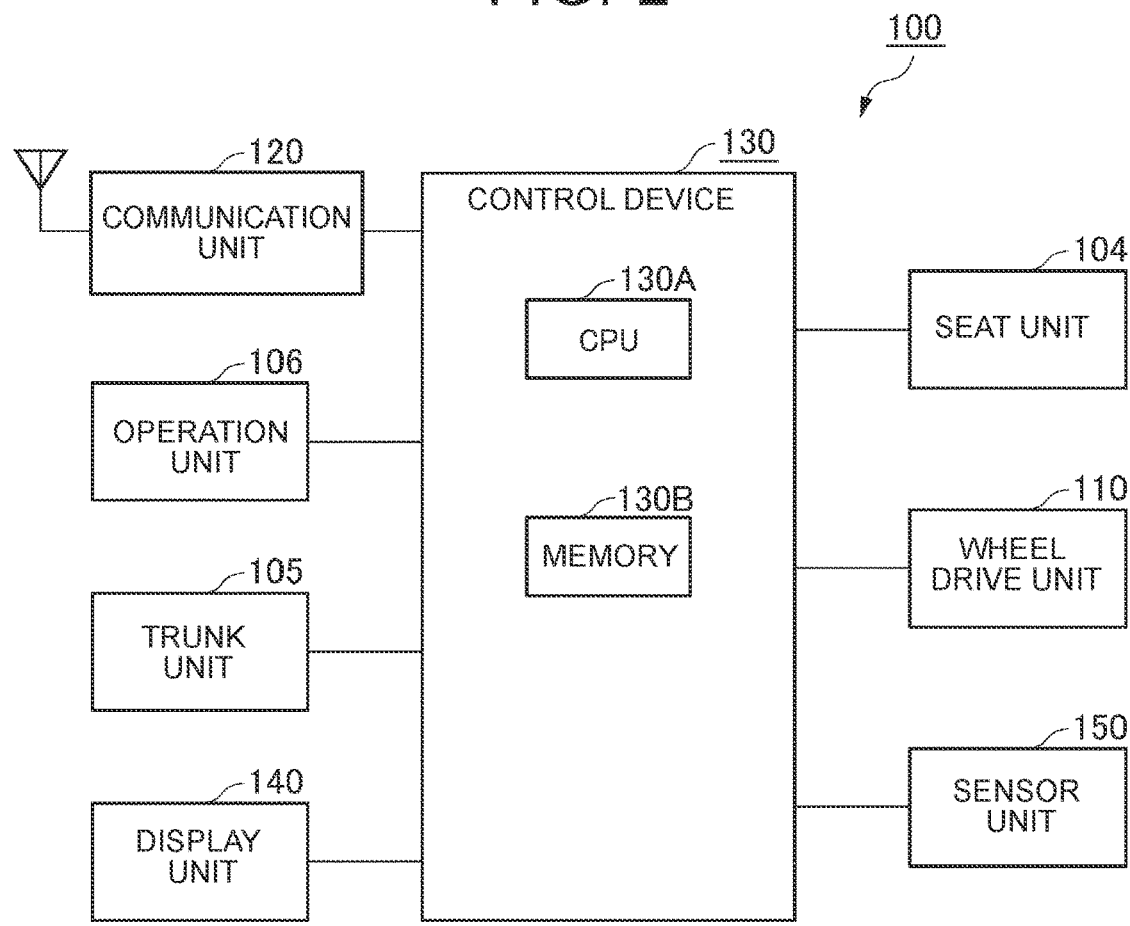
FIG. 2 is a block diagram illustrating a schematic system configuration of the movable body according to the present embodiment.

FIG. 2 is a block diagram illustrating a schematic system configuration of the movable body 100 according to the present embodiment. The movable body 100 according to the present embodiment includes: wheel drive units 110 configured to drive respective wheels 108; the seat unit 104 configured to control the seat on which an occupant sits, the side mirrors 109, and the like; the trunk unit 105 that receives the baggage of the occupant; a communication unit 120 that enables communication with an external device; the operation unit 106 that enables a driving operation by the occupant; a sensor unit 150 including various sensors and configured to output pieces of information acquired from those sensors to a control device 130; and a display unit 140 configured to display various notifications to the occupant and to operate the LEDs 107, etc., of the vehicle body 102.

The wheel drive unit 110 includes an electric motor and a brake provided in the vehicle body 102 and can rotationally drive the wheel 108 by the electric motor based on control data received from the control device 130 and change the direction of the wheel 108.

The seat unit 104 is configured to change the positions of the seat and the side mirrors 109 and the vehicle height of the vehicle body 102 based on control data received from the control device 130. More specifically, the seat unit 104 is configured to move the seat in the front-rear direction and in the up-down direction, change the rotation angles of the side mirrors 109, and change the vehicle height by means of respective electric motors attached to the seat, the side mirrors 109, and the vehicle body 102. Further, the seat unit 104 can operate the roof opening and closing mechanism based on control data received from the control device 130 such that the roof part of the vehicle body 102 can be accommodated inside the vehicle body 102.

The trunk unit 105 includes a trunk in which the baggage of the occupant is to be accommodated, and a door attached to the trunk. The trunk unit 105 can lock or unlock the door based on control data received from the control device 130.

The control device 130 (Electronic Control Unit) includes a CPU 130A and a memory 130B. The control device 130 generates a control signal to control each unit of the movable body 100 and outputs it to each unit. An actuator of each unit works based on the control signal. The CPU 130A controls the units by executing various computing processes included in this disclosure in accordance with commands included in various computer programs such as firmware stored in a nonvolatile semiconductor memory such as a flash memory included in the memory 130B. In the memory 130B, the following computer programs are stored: a computer program to execute various computing processes (including various computing processes illustrated in the flowchart of the drawing) included in this disclosure; a computer program to execute a computing process of controlling the wheel drive units 110 based on the operation unit 106; and a computer program to execute a computing process of autonomously controlling the wheel drive units 110 based on pieces of information acquired from the communication unit 120 and the sensor unit 150 at the time of automatic driving. Further, map data of a plurality of airports to which the movable body 100 is likely to move, including map data of terminal buildings and boarding gates, is also stored in the memory 130B. The memory 130B also includes a cache memory constituted by an SRAM, a DRAM, and the like in which data or the like of the computing processes executed by the CPU 130A is temporarily stored.

The operation unit 106 includes the handle operated by the driver to control the moving direction of the movable body 100 and an accelerator pedal and a brake pedal for operating the electric motors and the brakes provided in the wheel drive units 110. The control device 130 generates control signals to control the electric motors and the brakes of the wheel drive units 110 based on information received from the operation unit 106 and outputs the control signals to the wheel drive units 110. Further, the operation unit 106 can change the angle of the handle based on control data received from the control device 130. Note that, as the operation unit 106, a touch panel operable by the driver may be provided, or a microphone that recognizes the voice of the driver and sound recognition process software for a plurality of languages may be provided, so that the movable body 100 can be operated based on a pressing operation on the touch panel by the driver or based on an utterance made by the driver.

The sensor unit 150 includes various sensors and outputs, to the control device 130, information necessary for the control of the movable body 100 by the control device 130. The sensors may include a plurality of cameras configured to capture images in front of and behind the movable body 100, a LiDAR ranging system including a millimeter wave radar to avoid a collision with a pedestrian or the like, an infrared camera, and the like. The sensor unit 150 may include a semiconductor IC for image processing that enables image recognition or the like so that a lane where the movable body 100 should travel or an obstacle such as a pedestrian is recognized based on an image captured by the camera or the like, and information on the lane or the obstacle is output to the control device 130. Further, a current position may be estimated from a position sensing marker provided on a wall surface or the like in the airport and surrounding images or the like, and position information may be output to the control device 130. Furthermore, the sensor unit 150 may include a magnetic sensor configured to detect a magnetic marker embedded in a road where the movable body 100 moves and may output, to the control device 130, position information or other pieces of information (e.g., information indicative of a stop position and information indicative of a position where the movable body 100 cannot proceed). The control device 130 controls the wheel drive units 110 based on information received from the sensor unit 150 such that the movable body 100 stops at a position where the movable body 100 should stop or the movable body 100 is prevented from proceeding to the position where the movable body 100 cannot proceed. On this account, even in a case where the driver drives the movable body 100, the movable body 100 does not deviate from a predetermined region determined in advance so that the movable body 100 can travel in the region. Further, the sensor unit 150 may include a rotary encoder or the like for detecting the number of rotation or the like of the wheel 108 and output speed information to the control device 130 so that the movable body 100 is controlled such that the movable body 100 does not exceed a predetermined speed.

The communication unit 120 includes systems for transmitting and receiving information to and from a server device 200 in the airport, various facilities in the airport, and the user of the movable body 100. For example, the communication unit 120 includes a plurality of communication systems such as a near-field wireless communication system (NFC defined by NFC Forum) for transmitting and receiving information to and from a personal digital assistant possessed by the user, or a wireless communication system (WiFi based on the 802.11 standard defined by IEEE).

Further, the communication unit 120 may include a recognizer for recognizing an image or the like, e.g., a bar code reader that reads a two-dimensional bar code or the like shown on an airline ticket that the user has. Further, the communication unit 120 may be configured to acquire position information by the GPS or the like and output it to the control device 130.

The display unit 140 includes a display device such as a liquid crystal display that displays a notification to the occupant. Further, the display unit 140 includes a driver that changes, based on control signals from the control device 130, color and radiant intensity of lighting of the LEDs 107 attached to the surface of the vehicle body 102, LEDs or the like constituting part of the interior such as an LED attached to an instrument panel for displaying a meter and an LED to be used for lighting inside the vehicle, and the like.

Figure 3:
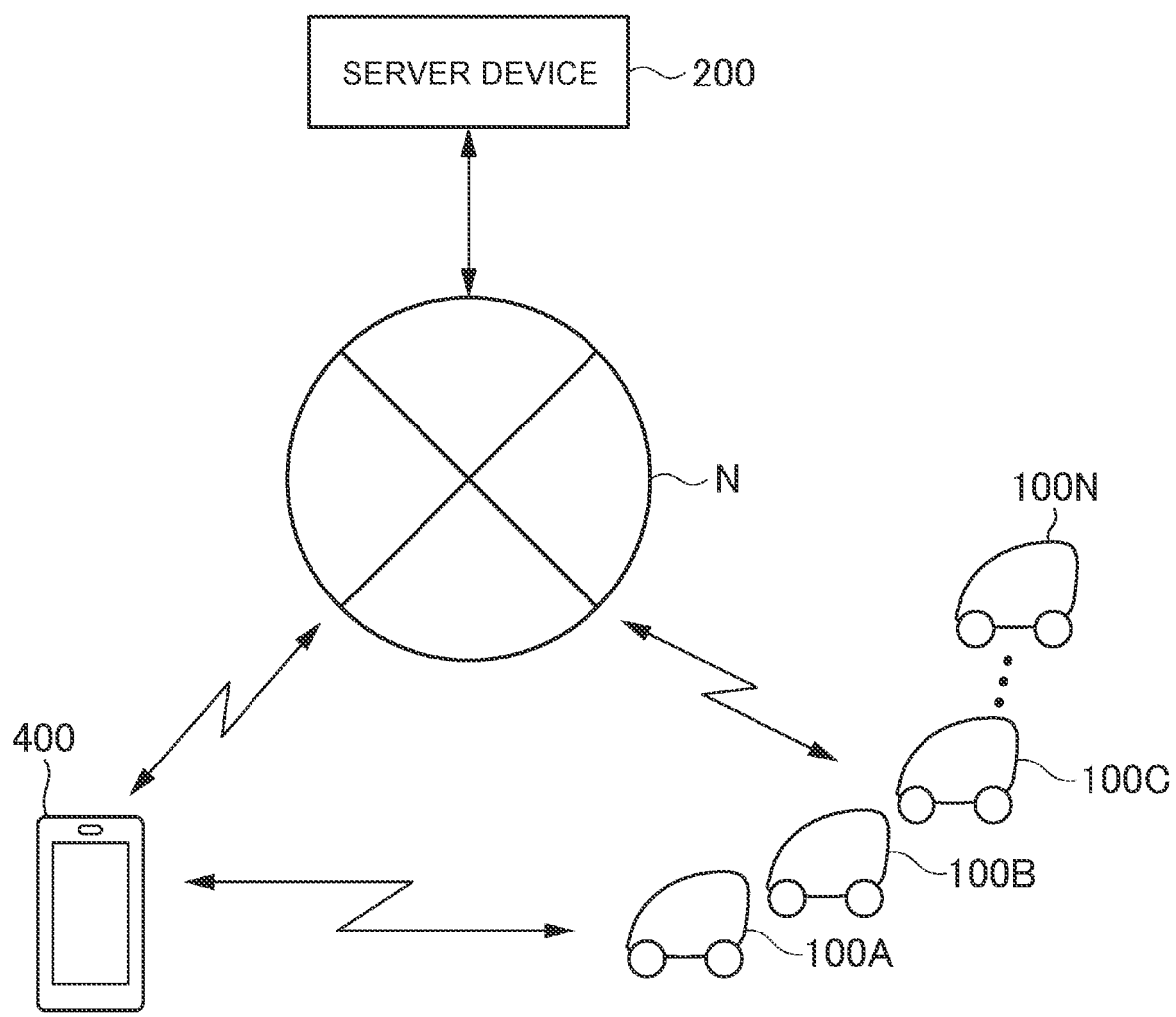
FIG. 3 is a schematic configuration diagram of a movable system according to the present embodiment.

FIG. 3 is a schematic configuration diagram of a movable system 300 according to the present embodiment. The movable system 300 includes a plurality of movable bodies 100 and the server device 200 that can transmit and receive information to and from each of the movable bodies 100 via a network N. Hereinafter, when a specific movable body 100 is referred to, a reference sign such as "100A" or "100B" is used, and when the movable body 100 is generally referred to, a reference sign "100" is used. The network N may be at least partially a public internet or may be an exclusive local area network (LAN).

Further, the server device 200 can transmit and receive information to and from a personal digital assistant 400 possessed by the user of the movable system 300 via the network N. Application software to use the movable system 300 is installed in the personal digital assistant 400, and the user can execute each computing process by the personal digital assistant 400 of the user as disclosed herein by starting the application software.

Further, the movable body 100 can transmit and receive information to and from the personal digital assistant 400 directly or via the network N. For example, the movable body 100 may be configured to directly communicate with the personal digital assistant 400 in an ad hoc mode defined by the 802.11 standard without using the network N.

The movable body 100 as described above can change the form in accordance with personal interest, taste, or physical traits on the premise that the movable body 100 is used by an unspecified number of users. The following describes a process for the user to use the movable body 100.

Figure 4:
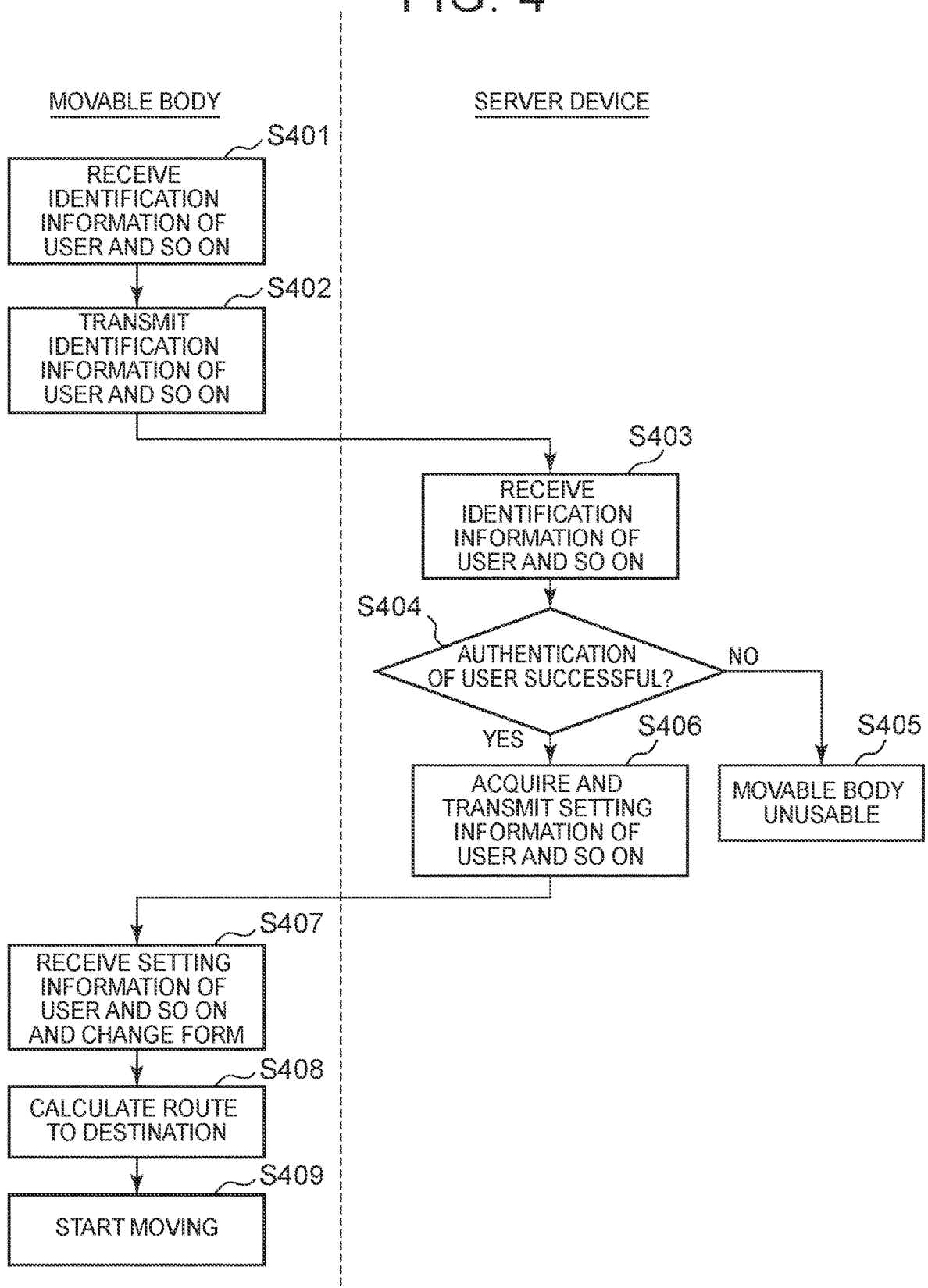
FIG. 4 is a flowchart of a usage method of the movable system according to the present embodiment.

FIG. 4 is a flowchart to describe a usage method of the movable body 100 according to the present embodiment. In the present embodiment, the user approaches one movable body 100A among the movable bodies 100 waiting near the entrance of a terminal building of the airport, for example, and holds a two-dimensional bar code of an electronic ticket of an airplane that is displayed on the personal digital assistant 400 possessed by the user over the bar code reader provided in the communication unit 120 of the movable body 100A. The two-dimensional bar code includes identification information of the user and identification information to specify the airplane that the user is planned to board. The movable body 100A receives the identification information of the user and the identification information to specify the airplane that the user is planned to board (step S401).

Subsequently, the communication unit 120 of the movable body 100A transmits the pieces of information that are received from the bar code reader and information to identify the movable body 100A that is stored in advance in the memory 130B to the server device 200 via the network N such as a wireless LAN by use of a wireless communication system such as WiFi, for example (step S402).

When the server device 200 receives, from the movable body 100A, the identification information of the user, the identification information of the airplane that the user is planned to board, and the identification information of the movable body 100A (step S403), the server device 200 authenticates, by use of a database provided in the server device 200, whether or not a person who is specified by the received identification information is registered in the database as a person who can use the movable body 100A (step S404).

Here, when the authentication is not successful, the server device 200 notifies the movable body 100A that the user cannot use the movable body 100A (step S405).

When the authentication is successful, the server device 200 further acquires, from the database, setting information set by the user in advance or set in advance for the user, information to specify a boarding gate where the airplane that the user is planned to board waits, and pieces of information to specify a scheduled boarding time to board the airplane, a scheduled take-off time of the airplane, and a planned landing place of the airplane, and the server device 200 transmits them to the movable body 100A (step S406). The setting information of the user includes information to set the colors of the LEDs 107 attached to the outer surface of the vehicle body 102, information to set the vehicle height of the vehicle body 102, information to set the opening and closing angles of the side mirrors 109, information to set the position of the seat of the seat unit 104 in the height direction and in the front-rear direction, and information to set the colors of the LEDs attached to the interior of the vehicle body 102. Further, the setting information includes language setting information to specify an official language determined based on a nationality acquired based on the identification information of the user. Further, the server device 200 registers, in the database, information indicating that the user is using the movable body 100A.

When the control device 130 of the movable body 100A receives those pieces of information via the network N and the communication unit 120, the control device 130 outputs, to the display unit 140, a control signal to change the colors of the LEDs 107 and the LEDs of the interior and outputs, to the seat unit 104, control signals to change the position of the seat in the height direction and in the front-rear direction and the opening and closing angles of the side mirrors 109. In accordance with the control signals, the outer shape of the vehicle body 102 such as the side mirrors 109 and the vehicle height and the appearance and the interior of the vehicle body 102 by the LEDs 107, etc., can be changed (S407). Further, the control device 130 outputs a control signal to cause the display unit 140 of the movable body 100A to display information indicating that the movable body 100A is usable by the user. Further, the control device 130 outputs a control signal to cause the display unit 140 to display, in the language (e.g., English) acquired based on the identification information of the user, the information to specify the boarding gate, the scheduled boarding time to board the airplane, the scheduled take-off time of the airplane, and the planned landing place of the airplane that are received from the server device 200. Accordingly, even in a case where the boarding gate and the scheduled boarding time change, the user can easily check them on the display unit 140. The user can unlock the trunk unit 105 by use of the operation unit 106, and after the user accommodates the baggage in the trunk unit 105, the user can lock the trunk unit 105 by use of the operation unit 106.

The control device 130 of the movable body 100A can further calculate a route to reach the boarding gate from a current position through a security inspection area and a passport control as through-points, based on the current position information of the movable body 100A that is acquired from the sensor unit 150, the information to specify the boarding gate that is received from the server device 200, and the map information of the terminal building that is stored in the memory 130B. Note that the map information includes information to specify a region where the movable body 100A can travel, and the control device 130 determines the route such that the movable body 100A travels in this region (step S408).

Based on the operation of the operation unit 106 by the user, the movable body 100A starts moving (step S409). The user may drive the movable body 100A by use of the handle or the like of the operation unit 106, or the user may switch the movable body 100A to the automatic driving mode so that the movable body 100A travels autonomously. The movable body 100A displays route guidance information to guide the route on the display unit 140.

The following describes a mode to change the form of the movable body 100 in a case where various types of users use the movable body 100. The server device 200 can acquire information about a user (including information disclosed when a traveler has determined a seat or the like of an airplane) by accessing a database owned by an airline company.

When the user is a person having a functional disorder of a lower limb or the like, the server device 200 can transmit, to the movable body 100A, setting information to set the vehicle height of the vehicle body 102 of the movable body 100A to a lowest position. Further, the server device 200 can transmit, to the movable body 100A, setting information to flash the LEDs 107, etc., in yellow or the like. Further, the server device 200 may transmit, to the movable body 100A, setting information to move the seat of the seat unit 104 to a backmost side so that the user can board the movable body 100A while the user is seated on a wheelchair. The control device 130 generates a control signal to control each unit based on those pieces of setting information and outputs it to each unit.

In this case, the outer shape of the movable body 100A, that is, the shape observable from outside is changed so that the vehicle height is placed at the lowest position. Since the vehicle height is the lowest position, the user can easily board the movable body 100A. Further, even in a case where each user with a wheelchair boards the movable body 100A by manpower, the user can easily board the movable body 100A, and further, safety at the time of movement increases. Further, by flashing the LEDs 107, etc., attached to the outer surface of the vehicle body 102 in yellow or the like, the movable body 100A can draw attention from airport users around the movable body 100A.

Note that the method to change the appearance of the vehicle body 102 is not limited to this. For example, the vehicle body may be configured such that the vehicle body is coated with paint including a magnetic body called paramagnetic paint and reflection light is controlled by use of a current so that the color of a part covered with the paint can be changed. Further, a flexible organic display or the like may be attached to the vehicle body 102 and its windows so that the appearance can be changed.

Note that, in addition to the appearance or the like, a maximum speed of the vehicle body 102, a travel route, and music played inside the vehicle body 102 may be determined based on the identification information of the user.

For example, the server device 200 may store, in the database, the identification information of the user and account information of a music service provided to the user in association with each other, so that the music service based on the account of the user may be provided inside the vehicle body 102.

In a case where the user is an airport staff such as an airport police officer, the server device 200 transmits, to the movable body 100A, setting information to set the vehicle height of the vehicle body 102 of the movable body 100A to a highest position, setting information to flash the LEDs 107, etc., in red or the like, and setting information to operate the roof opening and closing mechanism such that the roof part of the vehicle body 102 is accommodated inside the vehicle body 102. The control device 130 generates a control signal to control each unit based on those pieces of setting information and outputs it to each unit. Even in this case, the roof part as a part of the outer shape of the movable body 100 is accommodated inside the vehicle body 102, so that the outer shape of the movable body 100, that is, the shape observable from outside is changed. When the airport staff puts the upper body out of the roof part, the airport staff can look around from a high place. Further, by flashing the LEDs 107, etc., attached to the outer surface of the vehicle body 102 in red or the like, the airport users around the movable body 100A can easily understand that the airport staff in a position different from a traveler or the like boards the movable body 100A. Note that information on the airport staff who can use the movable body 100 including the movable body 100A and the like, the information being regularly received from the server device 200, may be stored in the memory 130B of the vehicle body 102, and the control device 130 may authenticate whether a person who is specified by the identification information received by the movable body 100A is a person who can use the movable body 100A or not, without communicating with the server device 200.

In a case where the user is a member of a service provided by the airline company, the server device 200 acquires, from the database, pieces of setting information set by the member in advance (the vehicle height of the vehicle body 102, the seat position, displays of the LEDs 107, etc., attached to the outer surface of the vehicle body 102 and tire wheels, displays by the LEDs, etc., of the interior, the opening and closing angles of the side mirrors 109), and transmits them to the movable body 100A. The control device 130 generates a control signal to control each unit based on those pieces of setting information and outputs it to each unit. Further, in a case where the movable body 100A is configured such that a transparent organic EL display the light transmittance of which is increased to about 80% is attached to side windows of the vehicle body 102, when setting information to inhibit light from outside from passing through the side windows is transmitted to the movable body 100A, the inside of the movable body 100A cannot be observed from outside.

It is possible to determine, in step S406, that the boarding time of the user is coming. In a case of such a traveler, the server device 200 may transmit, to the movable body 100A, setting information to cause the LEDs 107, etc., attached to the outer surface of the vehicle body 102 to display information indicative of an emergency regardless of setting information set by the traveler in advance. When the movable body 100 performs such a display, the movable body 100 can draw attention from the airport staff or the like.

With such a configuration, the form of the vehicle body such as color or shape can be changed in accordance with the interest or taste of each user. It is not necessary for the user to change the setting every time the user boards the movable body 100. Further, even when the user uses different movable bodies 100, the setting information can be shared between the movable bodies 100. When the color that can be visually recognized from the appearance is changeable, even the same movable body 100 can be used in respective forms corresponding to various types of users. Further, when the outer shape of the vehicle body is changeable, a wider range of use forms can be provided. Note that the setting information may be regularly transmitted from the server device 200 to the memory 130B and stored in the memory 130B.

Note that a facility where the movable body 100 is usable is not limited to the airport facility. For example, the movable body 100 may be used in an aquarium, a zoo, or the like. At this time, a display attached to the vehicle body 102 of the movable body 100 may be changeable based on the position information of the movable body 100. For example, near an elephant in the zoo, an image of the elephant may be displayed.

Further, among the movable bodies 100, an outstanding color may be displayed on the vehicle body 102 of the movable body 100A for a leader, and an unremarkable color of a similar shade may be displayed on respective vehicle bodies 102 of movable bodies 100B to 100N for a plurality of people following the leader.

Modification 1

Figure 5:
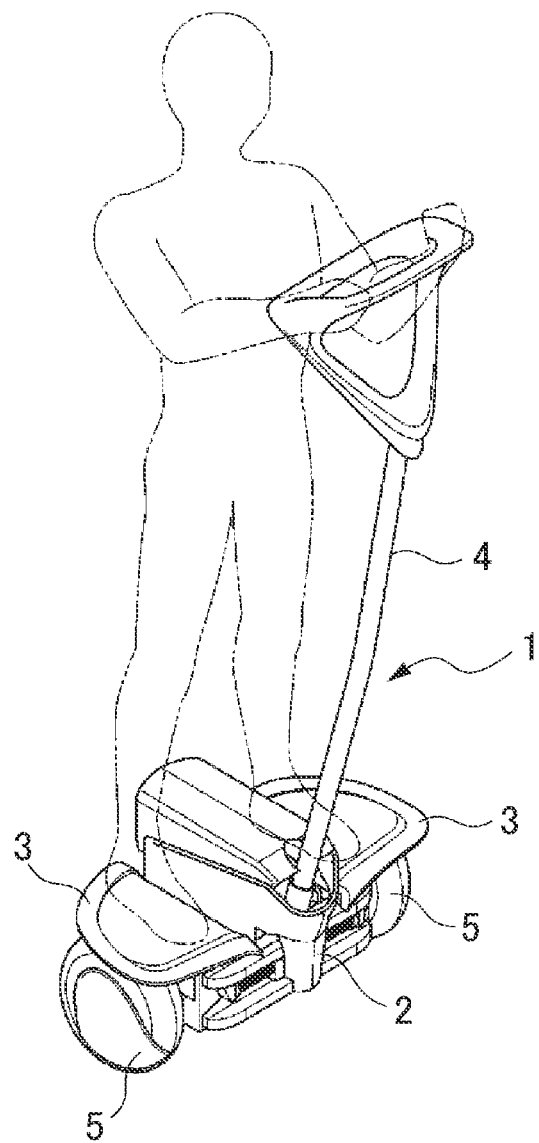
FIG. 5 is a view illustrating a schematic configuration of a movable body according to a modification of the present embodiment.

FIG. 5 is a perspective view illustrating a schematic configuration of a movable body 1 of a inverted-standing type according to a modification. The present disclosure may be applied to the movable body 1 as illustrated in FIG. 5. Further, the movable body 1 may be used together with the movable body 100.

The movable body 1 of the standing type includes, for example, a vehicle body 2, a pair of right and left step portions 3 attached to the vehicle body 2 such that an occupant rides on the step portions 3, an operation handle 4 attached to the vehicle body 2 in a tiltable manner and to be gripped by the occupant, and a pair of right and left driving wheels 5 rotatably attached to the vehicle body 2. The movable body 1 of the standing type is configured, for example, as a coaxial two-wheeler in which the driving wheels 5 are placed coaxially so that the movable body 1 travels while its standing state is maintained. The movable body 1 of the standing type is configured such that the movable body 1 moves forward and backward when the gravitational center of the occupant is moved in the front-rear direction so as to incline the step portions 3 of the vehicle body 2 in the front-rear direction, and the movable body 1 turns right and left when the gravitational center of the occupant is moved in the right-left direction so as to incline the step portions 3 of the vehicle body 2 in the right-left direction. Further, a trunk unit in which the baggage of the user such as a suitcase can be accommodated and held is provided inside the vehicle body 2 below the step portions 3. Note that the step portions 3 may be provided at a position further higher than the position illustrated in FIG. 5 so as to enlarge the accommodation space of the trunk unit. Further, as the movable body 1 of the standing type, the coaxial two-wheeler as described above is applied. However, an applicable embodiment of the present disclosure is not limited to this and is applicable to any movable body that travels while the standing state is maintained. For example, the movable body 1 may be a movable body having a size of a normal suitcase.

Such a movable body 1 can be achieved by wheel drive units including electric motors configured to drive the driving wheels 5, a posture sensor configured to detect the posture of the vehicle body 2, a pair of rotation sensors configured to detect rotation information of the driving wheels 5, a control device configured to control the wheel drive units, and a battery configured to supply electric power to the wheel drive units and the control device. Further, by including constitutes similar to the seat unit 104, the trunk unit 105, the operation unit 106, the communication unit 120, the control device 130, and the display unit 140 as illustrated in FIG. 1, it is possible to provide a movable body that allows the user to move comfortably in the airport or other facilities in conjunction with a service provided in the airport.

Such a movable body 1 is configured to change the standing angle and the height of the operation handle 4 from the horizontal plane based on the identification information of the user. On this account, the form of the movable body 1 can be changed in accordance with the height of the user or the taste of the user.

Further, the present disclosure can be modified variously without deviating from the gist of the present disclosure. For example, within a range of normal creativity of a person skilled in the art, some constituents in a given embodiment can be added to other embodiments. Further, some constituents in a given embodiment can be substituted with a corresponding constituent in other embodiments.

What is claimed is:

1. A movable body to be used by a plurality of users, the movable body comprising:
   an acquisition unit configured to acquire identification information of a user; and
   a form changing unit configured to output a control signal to change a form of the movable body based on the identification information,
   wherein, the form changing unit outputs the control signal to change an outer shape of the movable body so that the movable body is positioned at a lowest height among height positions of the movable body, when the identification information indicates that a lower limb of the user has a functional impairment.

2. The movable body according to claim 1, further comprising a display unit constituting part of an appearance of the movable body, wherein the form changing unit outputs a control signal to change a display made by the display unit based on the identification information.

3. The movable body according to claim 2, further comprising a second display unit constituting part of an interior of the movable body, wherein the form changing unit outputs a control signal to change a display made by the second display unit based on the identification information.

4. The movable body according to claim 1, further comprising:
   a transmission unit configured to transmit the identification information to a server device; and
   a receiving unit configured to receive setting information to change the form from the server device, wherein the form changing unit outputs the control signal to change the form of the movable body based on the setting information.

5. A movable system including the movable body according to claim 4 and the server device, wherein the server device includes
   a receiving unit configured to receive the identification information from the movable body,
   a second acquisition unit configured to acquire the setting information based on the identification information, and
   a second transmission unit configured to transmit the setting information to the movable body.

6. The movable system according to claim 5, wherein the server device includes
- a third acquisition unit configured to acquire language setting information based on the identification information, and
- a third transmission unit configured to transmit the language setting information to the movable body, wherein the movable body includes a third display unit configured to display information of the user in a language based on the language setting information.

\* \* \* \* \*